Patented Jan. 5, 1926.

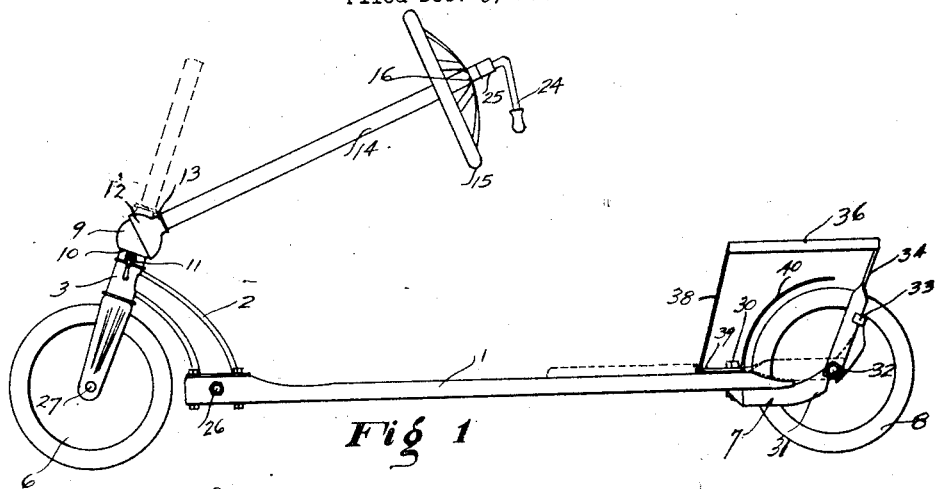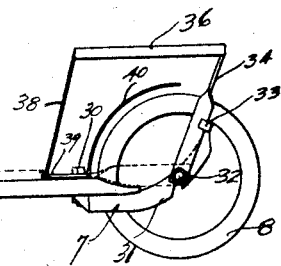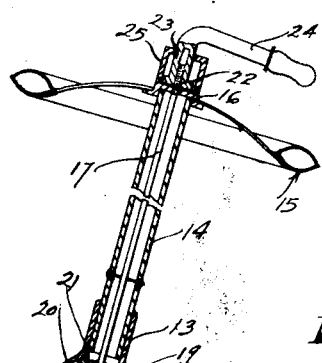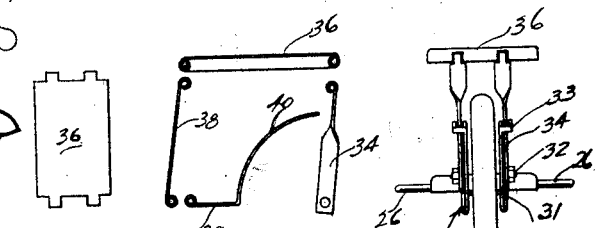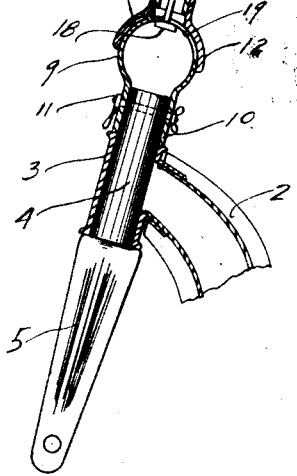

1,568,412

UNITED STATES PATENT OFFICE.

RICHARD W. PARKES, OF SAN FRANCISCO, CALIFORNIA.

SCOOTER.

Application filed December 9, 1924. Serial No. 754,771.

*To all whom it may concern:*

Be it known that I, RICHARD W. PARKES, a citizen of the United States, residing at San Francisco, in the county of San Francisco and State of California, have invented new and useful Improvements in Scooters, of which the following is a specification.

This invention relates to improvements in children's vehicles of the type known as scooters or coasters constructed so that the operator may place one foot on the device and propel it with the other foot or may sit upon the vehicle and use the same as a coaster.

The invention relates to scooters of the type shown in my U. S. Letters Patent No. 1,416,864, issued May 23, 1922, and resides in the provision of a simply constructed, strong and durable scooter in which the steering mechanism may be tilted from its normal upright position into rearwardly inclined position whereby the operator instead of standing on the scooter may sit upon a collapsible seat forming a part of the invention and from the seated position steer the scooter.

One of the objects of the invention is to provide a novel form of seat and wheel mounting to provide for the collapsible seat that may be disposed in a position such that the vehicle may be easily balanced and will be steady in its operation, the said seat being subject to being moved into out of the way position, lying flat on the running board of the scooter when not in use.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Referring to the drawing:

Fig. 1 represents a side elevation of the vehicle of the invention.

Fig. 2 represents an elarged fragmentary vertical section of the hinged steering device.

Fig. 3 represents a top plan view of the seat.

Fig. 4 represents a side elevation of the seat and wheel guard assembly, the parts being detached but in approximately the same positions as when assembled.

Fig. 5 represents an elevation of the seat and its mounting showing the rear wheel and its mounting as associated with the seat and its mounting.

Fig. 6 is a perspective view of the rear wheel mounting.

The embodiment of the invention shown in detail in the accompanying drawing comprises an elongated body or running board 1 extending upward and forwardly from the front end of which is an arm 2 carrying on its outer end a bearing 3 for a spindle 4. The spindle 4 carries a fork 5 in which the front wheel 6 is journaled.

A U-shaped bracket 7 is fastened to the other end of the body, extends rearward thereof and supports the rear wheel 8. The wheels and mountings are such that the body is supported in horizontal position close to the ground and the device therefore has a low center of gravity.

The upper end of the spindle 4 supports a hollow spherical member 9. A tubular extension 10 extends from this spherical member and telescopes the upper end of the spindle, being removably secured thereto by a fastening 11. Bearing on the upper side of the spherical member is a semi-spherical cap 12, having a socket 13 in which a tubular steering column 14 is secured in any suitable manner. A steering wheel 15 is secured to the upper end of the column. Extending through the hub 16 of the wheel and through the column is a rod 17 having a head 18 on its lower end. This rod is movable through a slot 19 in the spherical member 9 and the head engages the inner side of said member 9, being larger than the slot to adjustably anchor the rod to the member 9. The cap is grooved as at 20 and the member 9 has a lug 21 engaging in the groove. The groove and slot are aligned and the steering column is adjustable in one plane only, from its upright position shown in dotted lines, to its full line position shown in Fig. 1.

The upper end of the rod is screw threaded as at 22 and has a nut 23 turned on said end. The nut has a handle 24 fixed to it which handle extends radially from the hub above the wheel. A cap 25 houses the nut and is fastened to the hub of the steering wheel. On turning the handle 24 in one direction, the nut and rod will be loosened to permit free swinging of the column and steering wheel into rearwardly inclined position or from such position to upright position. On turning the handle to tighten the rod the cap clamps on the spherical member 9 and the column and wheel may be locked in upright or rearwardly inclined position as desired.

Extending from opposite sides of the body 1 at the forward end thereof are foot rests 26. The axle 27 for the front wheel may be extended on opposite sides of the wheel to provide foot rests. These two sets of rests adapt the vehicle for large or small children.

The U-shaped bracket 7 is made of a single piece of strap iron comprising a body portion 29 engaging the under side of the body 1 near the end of said body and secured thereto by bolts 30. Extending first horizontally and outwardly, then upwardly and rearward from the body portion 29, are arms 31. Between the ends of the upwardly curved portions of these arms the axle 32 for the rear wheel is journaled. The upper ends of these arms are bent to provide stop hooks 33. Pivoted on the rear axle and extending upward therefrom are seat standards 34 extending on opposite sides of the rear wheel and hinged to the rear edge of a seat 36. Hinged to the front edge of the seat and depending therefrom are similar standards 38. The standards 38 are hinged at their lower ends to the foot portion 39 of a wheel guard 40 which latter curves upward and rearward from the body 1 over the rear wheel. The bolts 30 pass through and secure the foot portion in place.

The standards 34 and 38 are of such length that the seat will be supported several inches above and over the rear wheel. The standards 34 engaging in the stop hooks 33 on the upper ends of the arms 31 of the wheel bracket 7, limit the movement of the seat to the position shown in full lines in Fig. 1. These hooks and the arms 31 also act to brace the seat mounting. When the seat is not in use it may be swung forward and down on the body 1 to lie flat thereon, as shown in Fig. 1, in an out of the way position. At the juncture of the body portion 29 of the bracket 7, with the arms 31, the strap metal is folded as at 41 to dispose the arms 31 with their broad sides in a vertical plane and to provide strength. The arms 31 are apertured as at 42 to receive the rear axle.

The operator places one foot on the body 1 and propels the vehicle with the other foot, the seat being then folded down and the steering mechanisms being in upright position so that the operator may hold onto the steering wheel while standing upright on the vehicle.

By using the seat and tilting the steering means rearward as shown in Fig. 1, the operator may sit on the seat and use the vehicle as a coaster, the feet being placed on either pair of foot rests. The seat is supported and so disposed that the vehicle may be evenly balanced and will be steady in its operation.

I claim:

1. A scooter comprising an elongated body portion, wheels disposed adjacent the ends of the body portion, means providing for steering the front wheel, a wheel mounting attached to the rear end of the body including arms extending rearwardly and upwardly from said rear end between which arms the rear wheel is mounted, an axle for the rear wheel supported by and between said arms at a point intermediate the ends of the latter, stop members on the outer ends of said arms, seat standards pivoted on the body and said rear axle, a seat to which said arms are pivoted, which seat is movable from upright position extending over the wheel into collapsed position lying flat on the body, said stops being adapted to engage the rearmost standards and limit the movement of the seat.

2. A scooter comprising an elongated body, a wheel disposed in front of said body, means for connecting the wheel with the body providing for steering of the wheel, steering means associated with the wheel, a U-shaped rear wheel mounting attached to the body at the rear end thereof and having its arm portions extending rearwardly and upwardly from said body, a rear wheel journaled between the ends of said arm portions of the mounting, a wheel guard extending from the body over said wheel and fastening elements inserted through the guard, body and wheel mounting, seat standards hinged to the portion of said guard engaging the body, seat standards pivoted on the arm portions of the wheel mounting, a seat hinged to the upper ends of said standards and movable from upright position extending over the wheel into collapsed position lying on the body and vice versa and stop members on the upper ends of said arm portions with which the last named standards engage when said standards are disposed in an upwardly and rearwardly inclined position supporting the seat over the wheel.

3. A scooter comprising an elongated body, a wheel disposed in front of said body, means for connecting the wheel with the body providing for steering of the wheel, steering means associated with the wheel, a U-shaped rear wheel mounting attached to the body at the rear end thereof and having its arm portions extending rearwardly and upwardly from said body, a rear wheel journaled between the ends of said arm portions of the mounting, a wheel guard extending from the body over said wheel and fastening elements inserted through the guard, body and wheel mounting, seat standards hinged to the portion of said guard engaging the body, seat standards pivoted on the arm portions of the wheel mounting, a seat hinged to the upper ends of said standards and movable from upright position extending over the wheel into collapsed position lying on the body and vice versa and hook-like stop members into which the rearmost standards engage when said standards are disposed in upwardly and rearwardly inclined position with the seat extending over the wheel.

RICHARD W. PARKES.